(12) United States Patent
Clapper

(10) Patent No.: US 6,856,952 B2
(45) Date of Patent: Feb. 15, 2005

(54) DETECTING A CHARACTERISTIC OF A RESONATING CAVITY RESPONSIBLE FOR SPEECH

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 09/796,301

(22) Filed: Feb. 28, 2001

(65) Prior Publication Data

US 2002/0120449 A1 Aug. 29, 2002

(51) Int. Cl.[7] ............................................. G10L 15/00
(52) U.S. Cl. ..................................... 704/200; 704/255
(58) Field of Search ............................. 704/200, 255, 704/250, 260

(56) References Cited

U.S. PATENT DOCUMENTS

| 4,821,326 | A | * | 4/1989 | MacLeod ..................... 704/261 |
| 5,326,349 | A | * | 7/1994 | Baraff ............................ 623/9 |
| 6,006,175 | A | * | 12/1999 | Holzrichter ................. 704/208 |
| 6,487,531 | B1 | * | 11/2002 | Tosaya et al. ............... 704/246 |

* cited by examiner

Primary Examiner—Daniel Abebe
(74) Attorney, Agent, or Firm—Robert A. Diehl

(57) ABSTRACT

A characteristic of one or more human resonating cavities may be utilized to provide information for speech recognition, independent from the actual sounds produced. In one embodiment, information about the changing shape of the human oral cavity may provide information useful in determining the nature of a person's vocalizations for speech recognition purposes.

25 Claims, 3 Drawing Sheets

DETECTING A CHARACTERISTIC OF A RESONATING CAVITY RESPONSIBLE FOR SPEECH

BACKGROUND

This invention relates generally to the field of speech recognition.

A wide variety of techniques are currently available for recognizing human speech. Digital systems may receive a spoken command, may match the command to a digital vocabulary, and may take actions in response to the recognition of that command. Similarly, speech recognition systems may recognize spoken sounds and may convert those spoken sounds into displayed text.

There are a number of deficiencies with existing speech recognition systems, which relate either to their accuracy or to the need for an actual vocalization in order to determine the nature of the communication. With respect to their accuracy, it is known that all existing speech recognition systems, to varying degrees, are inaccurate. That is, they misinterpret the actual spoken phrase and therefore, create errors. The extent of these errors may be reduced by repeatedly speaking to the system and making corrections that may be learned over time.

The need for an actual vocalization may have a number of drawbacks. In some cases, the need for a vocalization may disturb other parties that are in the vicinity. For example, in a library, a user speaking into a dictating machine may disturb surrounding patrons. Similarly, in conferences, it may be desired to dictate the proceedings, but to do so may disrupt those proceedings. Devices are known which go over the user's mouth and allow the user to speak without being readily heard by those around the user.

In some cases, ambient noise may be so significant that it is difficult for speech recognition systems to extract the spoken commands from the surrounding noise. Thus, the accuracy of the systems may be dramatically reduced by the need for vocalizations.

Finally, in some cases, human users may be unable to actually vocalize a particular sound. This may occur for a wide range of reasons including those related to diseases of the larynx or the absence of a larynx.

Thus, there is a need for better techniques for facilitating speech recognition.

DETAILED DESCRIPTION

Figure 1:
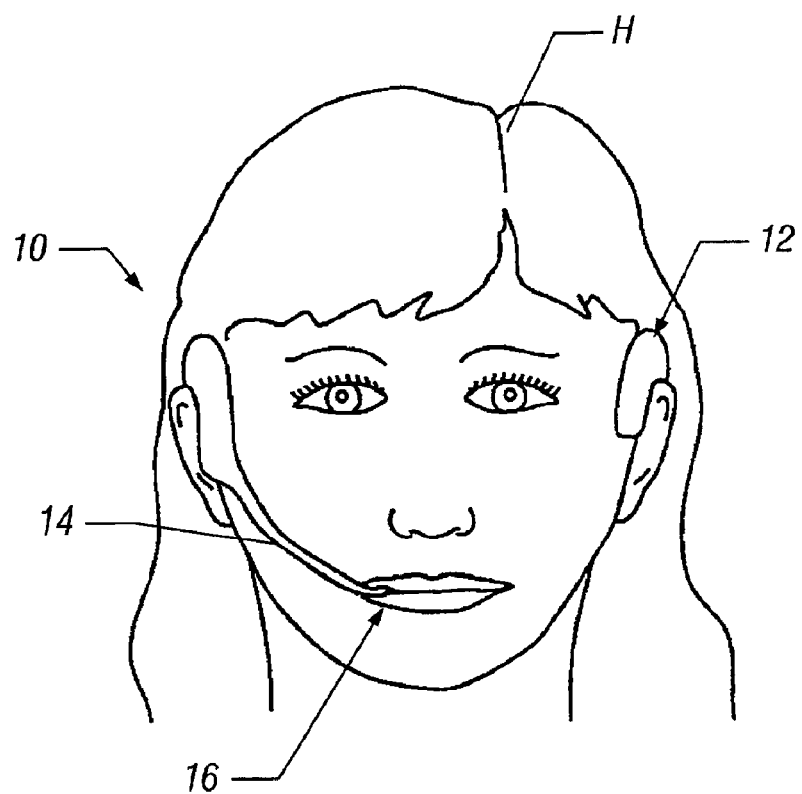
FIG. 1 is a depiction of a person wearing a device in accordance with one embodiment of the present invention.

A vocalization recognition system 10 may include an ear-mounted housing 12, which in one embodiment may be connected by a band (not shown) extending around the back of the user's head "H". The housing 12 may be mounted on the user's ears and may include battery-powered electronics for receiving information from the user's internal resonating cavities.

In particular, the housing 12 may be coupled to a sensor 16 that extends into the user's oral cavity. An electrical line may extend through a tubular housing 14 between the housing 12 and the sensor 16.

The sensor 16 may conventionally be a transceiver that emits and receives energy. The emitted energy may be sound waves such as white or pink noise or ultrasonic energy as examples. The acoustic or ultrasonic energy may be sufficient to penetrate soft tissue but may not readily pass through bone. Instead the energy may be reflected by dense structures. Thus, it may be desirable to position the sensor 16 at a location interior of the user's teeth 18, shown in FIG. 2, so that the teeth 18 do not block the energy emitted or received by the sensor 16.

In one embodiment, the sensor 16 emits energy such as an acoustic or ultrasonic signal, which is reflected by bodily tissue and returned to the sensor 16. In accordance with well-known technology, a very detailed depiction of the soft tissues between a reflecting surface and the sensor 16 may be developed.

Figure 2:
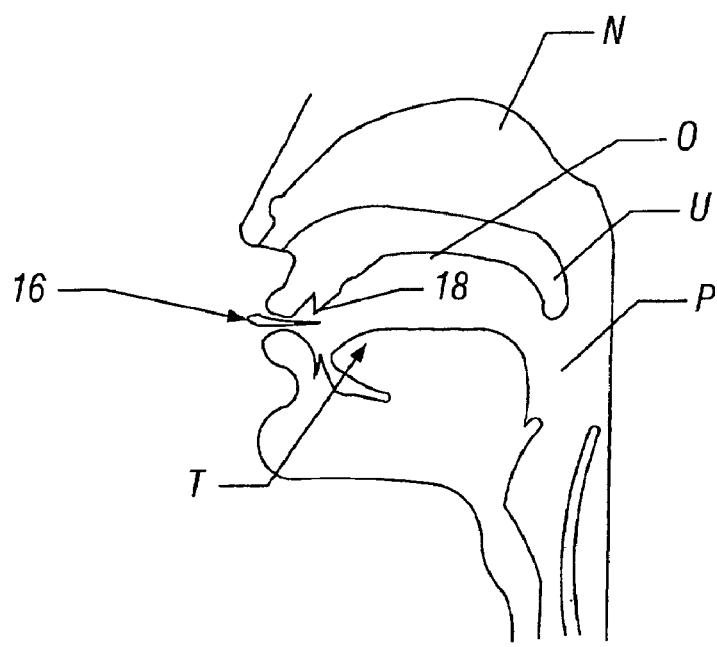
FIG. 2 is a cross-sectional view through a user's head showing the positioning of a device in accordance with one embodiment of the present invention.
Figure 3:
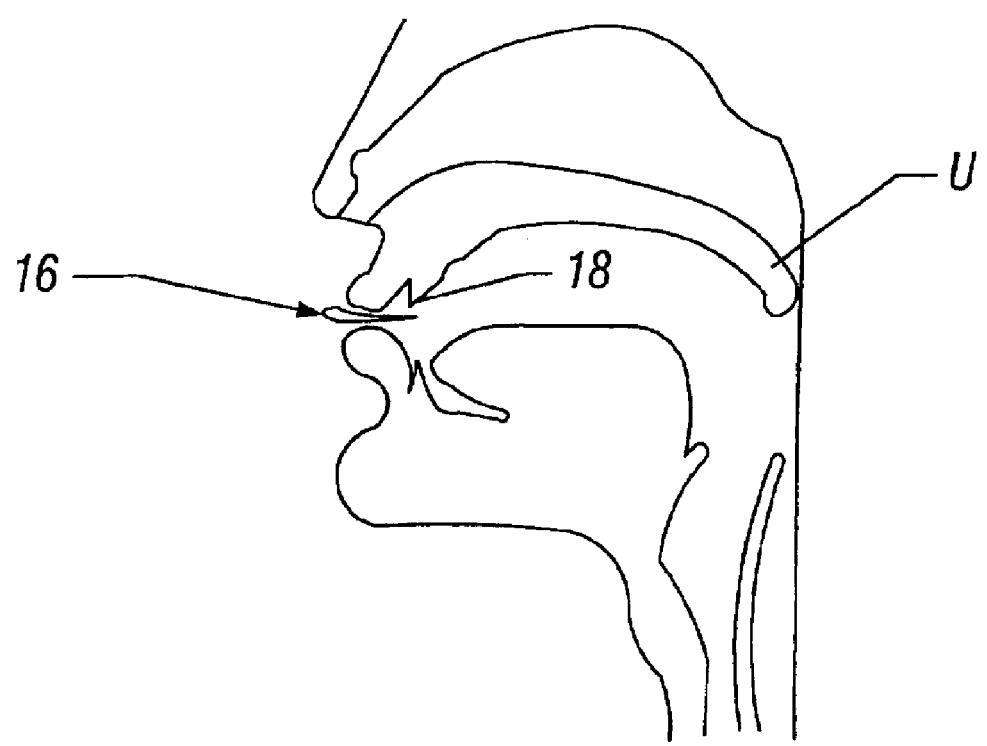
FIG. 3 is a cross-sectional view corresponding to FIG. 2, but with the configuration of the oral cavity having been modified, for example, to create a particular vocalization.

Referring to FIG. 2, in particular, the sensor 16 may obtain information about the nature of the oral resonating cavity O. In some embodiments, it may also be possible to obtain information about the pharyngeal resonating cavity P and the nasal resonating cavity N. The shape of each of these cavities may be modified in order to create particular vocalizations normally associated with human speech. Comparing FIGS. 2 and 3, it may be seen that the shape of the oral cavity O may be modified as a result of the movement of the soft palette U relative to the oral, nasal and pharyngeal cavities in the course of making spoken vocalizations.

Thus, if the sensor 16 emits energy, such as acoustic or ultrasonic energy, that may be affected by soft tissues within the body's resonating cavities, information may be received that may very specifically detail a characteristic of those resonating cavities, which characteristic then may be linked to particular vocalizations normally associated with speech. This information may then be utilized to determine the nature of the sounds being created by the person, without actually detecting the resulting sounds.

In some embodiments, non-audible characteristics may be useful in order to achieve speech recognition without requiring vocalizations. In other cases, those characteristics may be useful in providing supplementary information to improve the accuracy of speech recognition systems, which heretofore have relied entirely on the sounds produced as a result of alterations of the resonating cavities. In still other embodiments, persons who are unable to utter sounds may enjoy the benefits of digital speech recognition because they may naturally manipulate their resonating cavities in a way to provide information that may be correlated to known vocalizations.

Thus, in some embodiments, relatively minute changes of a characteristic of one or more resonating cavities may be correlated to various vocalizations, which in turn may be correlated to speech. The characteristic that is detected may vary and in some embodiments may include the shape of one or more resonating cavities particularly including the oral resonating cavity as well as other characteristics such as the suppleness or density of soft tissues associated with those cavities. For example, the density information may correlate to muscle tension, which may be indicative of certain vocalizations.

In some embodiments, the sensor 16a may be a sensor of the type associated with acoustic or ultrasonic imaging technologies that is capable of developing information about soft tissues. Thus, the particular shape of one or more resonating cavities, particularly including the oral cavity, may be inferred over time. The configurations at each particular instance of time may correlate to a given vocalization, such as that of particular consonants or vowels or groups of the same. This information may then be correlated to actual speech for speech recognition purposes.

In particular, the characteristics of the human oral cavity may correlate to a large number of vocalizations. These characteristics include the positioning of the soft palette U and particularly the orientation of the teeth is and tongue T. Thus, this information may be utilized, either alone or in conjunction with sound produced by different resonating cavities, to deduce information about the user's speech. This information may be useful not only for detecting speech, but also for the diagnosis of various communicative disorders.

Figure 4:
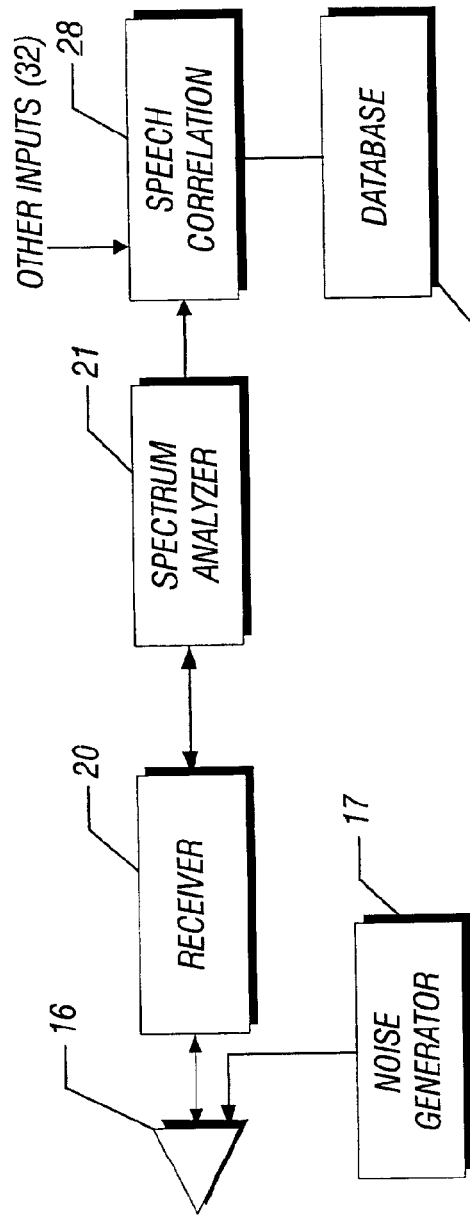
FIG. 4 is a block depiction of hardware in accordance with one embodiment of the present invention.

Referring to FIG. 4, the sensor 16 may emit and detect acoustic energy in one embodiment. In particular, a noise generator 17 may develop white or pink noise which may be emitted by the transducer 16 in accordance with one embodiment to the present invention. Likewise, the transducer 16 may receive reflected acoustic energy from a human resonating cavity. That information may be passed to a receiver 20 which filters and otherwise pre-processes the received acoustic energy. A spectrum analyzer or a real time analyzer 21 may be utilized to determine the frequency response of a human resonating cavity. That frequency response may then be correlated with speech using a speech correlation unit 28. The unit 28 may use information in a database 30 gathered about the frequency response of a human resonating cavity in varying conditions. These conditions may be correlated to sounds associated with speech. The speech correlation unit 28 may also receive other inputs such as actual audible information in one embodiment of the present invention.

Figure 5:
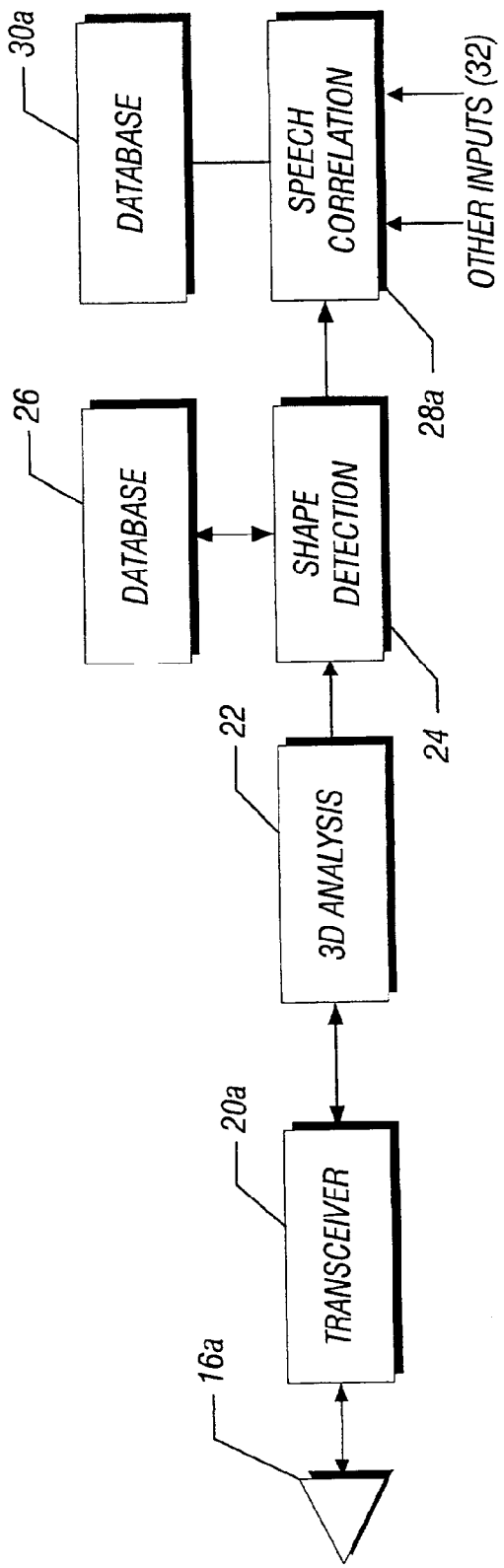
FIG. 5 is a block depiction of hardware in accordance with one embodiment of the present invention.

Referring to FIG. 5, in accordance with an embodiment using ultrasonic energy, the sensor 16a may be coupled to a transceiver 20a, which in one embodiment may be located within the housing 12. The transceiver 20a transmits and receives the reflected transmitted energy from the sensor 16a. The transceiver 20a then communicates with a three-dimensional analysis system 22. The image which may be produced by an ultrasonic energy source may be derived in three dimensions to create a three-dimensional representation of a resonating cavity. Thus, the three-dimensional analysis system 22 may generate a three-dimensional representation at an instance of time of a human resonating cavity.

The three-dimensional representation may be provided to a shape detection unit 24. The shape detection unit 24 may use a database 26 to correlate particular vocalizations with particular resonant cavity characteristics such as shapes. These characteristics may then be correlated to known vocalizations or vocalization portions. Those vocalizations may then be accumulated over time by a speech correlation unit 28a, which correlates known vocalizations with digital representations of speech, such as text. For example, the speech correlation unit 28 may include a database 30a that provides mathematical representation of phonemes that assist in speech recognition as one example.

The speech correlation unit 28 may also receive other inputs 32 such as sound inputs, as one example, to improve the accuracy of speech correlation. In other words, the speech correlation may be the result of information about a characteristic of a human resonating cavity as well as the resulting sound in some embodiments.

A characteristic may be utilized to augment existing speech recognition systems, which, heretofore, have relied only on the audible information. In addition, speech recognition may be achieved without the need for actual vocalizations in some embodiments. This may be important in situations where it is desirable, for noise control reasons, to limit the actual vocalizations. It may also be desirable in environments where high noise makes the audible information less useful. Similarly, these techniques may be useful for enabling communication by people who have physical characteristics that limit their ability to vocalize sounds.

In some embodiments of the present invention, both audible and inaudible information may be utilized for speech recognition purposes. Not only may the information be combined to obtain more information about an intended communication, but also, one form of information may be utilized to augment the other. For example, the actual audible information may be utilized to provide emphasis to information which was detected using information about a characteristic of a human resonating cavity. Thus in the case of speech detects conversion, the text may be switched to bold when audible communication is received and may be placed in normal fonts when no audible information is received as one embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting a characteristic of a human resonating cavity;
   based on the characteristic, obtaining information about a vocalization corresponding to that characteristic;
   determining if the vocalization is audible or inaudible;
   capturing the vocalization in a first format if the vocalization is audible; and
   capturing the vocalization in a second format if the vocalization is inaudible.

2. The method of claim 1 wherein detecting a characteristic of a human resonating cavity includes detecting the shape of a resonating cavity.

3. The method of claim 1 wherein the human resonating cavity comprises a human oral resonating cavity.

4. The method of claim 1 wherein detecting the characteristic comprises emitting energy into the human resonating cavity.

5. The method of claim 1 wherein detecting the characteristic comprises:
   emitting acoustic energy into the human resonating cavity; and
   receiving said acoustic energy out of the human resonating cavity in order to detect the characteristic.

6. The method of claim 1 wherein detecting the characteristic comprises using a head mounted detector.

7. The method of claim 1 wherein obtaining information about the vocalization comprises recognizing human speech.

8. The method of claim 1 wherein capturing the vocalization comprises speech to text processing.

9. The method of claim 1 wherein the first format comprises bold text and the second format comprises normal text.

10. The method of claim 1 wherein detecting the characteristic includes detecting a frequency response of the human resonating cavity.

11. A system comprising:
 a first detector to detect a characteristic of a human resonating cavity;
 a second detector to detect sound associated with the characteristic; and
 a controller to obtain information about a vocalization corresponding to the characteristic, determine if the vocalization is audible or inaudible, capture the vocalization in a first format if the vocalization is audible, and capture the vocalization in a second format if the vocalization is inaudible.

12. The system of claim 11 further comprising:
 a transmitter to transmit energy into the human resonating cavity, said first detector to receive the energy out of the human resonating cavity.

13. The system of claim 12 wherein the energy comprises acoustic energy.

14. The system of claim 11 wherein the characteristic comprises information about a shape of the human oral resonating cavity.

15. The system of claim 11 wherein the first detector comprises an acoustic transducer to emit noise into the human resonating cavity and to obtain information about the human resonating cavity based on the noise.

16. The system of claim 11 wherein the first detector is to fit within a user's mouth.

17. The system of claim 11 wherein said first detector is a head-mounted detector.

18. The system of claim 11 wherein, to capture the vocalization, the controller is to convert spoken words into text.

19. The system of claim 11 wherein, to obtain information about the vocalization, the controller is to recognize speech using said characteristic.

20. The system of claim 11 wherein the first format comprises bold text and the second format comprises normal text.

21. An article comprising a medium storing instructions that enable a processor-based system to:
 detect a characteristic of a human resonating cavity;
 based on the characteristic, obtain information about a vocalization corresponding to that characteristic;
 determine if the vocalization is audible or inaudible;
 capture the vocalization in a first format if the vocalization is audible; and
 capture the vocalization in a second format if the vocalization is inaudible.

22. The article of claim 21 wherein the instructions to obtain information about the vocalization comprise instructions to develop information about a shape of the human resonating cavity.

23. The article of claim 21 wherein the instructions to obtain information about the vocalization comprise instructions to detect speech.

24. The article of claim 21 wherein the instructions to capture the vocalization comprise instructions to convert speech to text.

25. The article of claim 21 wherein the first format comprises bold text and the second format comprises normal text.

* * * * *